United States Patent [19]

Nakamura et al.

[11] Patent Number: 4,814,237

[45] Date of Patent: Mar. 21, 1989

[54] THIN-FILM ELECTROLUMINESCENT ELEMENT

[75] Inventors: Noriaki Nakamura, Nara; Kinichi Isaka, Koriyama; Masashi Kawaguchi; Hiroshi Kishishita, both of Nara; Hisashi Uede, Wakayama, all of Japan

[73] Assignee: Sharp Kabushiki Kaisha, Osaka, Japan

[21] Appl. No.: 77,081

[22] Filed: Jul. 24, 1987

Related U.S. Application Data

[63] Continuation of Ser. No. 799,558, Nov. 20, 1985, abandoned, which is a continuation-in-part of Ser. No. 741,158, Jun. 4, 1985, abandoned.

[30] Foreign Application Priority Data

Jun. 28, 1984 [JP] Japan ............................... 59-134760

[51] Int. Cl.$^4$ ........................ H05B 33/12; B32B 17/06

[52] U.S. Cl. .................................... 428/690; 428/917; 313/503; 313/506

[58] Field of Search ............... 428/690, 691, 917, 432, 428/433; 313/503, 506, 509

[56] References Cited

U.S. PATENT DOCUMENTS

| | | | |
|---|---|---|---|
| 3,129,108 | 4/1964 | Katona | 428/917 X |
| 4,416,933 | 11/1983 | Anston et al. | 428/917 |
| 4,602,189 | 7/1986 | Panicker | 313/505 |
| 4,613,546 | 9/1986 | Kuwata et al. | 313/509 |
| 4,613,793 | 9/1986 | Panicker et al. | 313/509 |
| 4,668,582 | 5/1987 | Matsuoka et al. | 428/690 |
| 4,670,355 | 6/1987 | Matsudaira | 428/690 |
| 4,727,003 | 2/1988 | Ohseto et al. | 428/690 |

*Primary Examiner*—Nancy A. B. Swisher

*Attorney, Agent, or Firm*—Flehr, Hohbach, Test, Albritton & Herbert

[57] ABSTRACT

A thin film EL element has a glass substrate, a pair of electrode layers formed on this glass substrate, and an electroluminescent layer sandwiched between these electrode layers. The glass substrate is of non-alkali type and has volume resistivity of $10^6$ ohm-cm or greater at 600° C., alkali content of 0.5 wt % or less, and strain point of 600° C. or higher.

2 Claims, 2 Drawing Sheets

THIN-FILM ELECTROLUMINESCENT ELEMENT

This is a continuation of application Ser. No. 799,558 filed Nov. 20, 1985, now abandoned, which is a continuation-in-part of application Ser. No. 741,158, filed June 4, 1985, now abandoned.

This invention relates to a thin film electroluminescent (EL) element which emits light when an electric field is applied thereon and more particularly to improving the reliability of a thin film EL element by specifying the material composition of its glass substrate.

Production of thin film EL elements includes several high temperature vapor deposition, sputtering and high temperature thermal treatment processes. This means that their substrates are exposed several times to high temperatures of about 600° C. and that the strain point of the substrate material which indicates the limit of its working temperature must be over 600° C.

Molten silica (quartz glass) with high purity is most appropriate as the substrate glass of a thin film EL element because it is extremely stable even at high temperatures but it is not practical because it would raise the production cost of the elements too high. Thus, use is generally made of low alkaline borosilicate glass but the alkali ions ($Li^+$, $Na^+$ and $K^+$) contained in the glass become deposited on the substrate surface during high temperature processes in the production of EL elements, depending on the volume resistivity (or volume electric conductivity) of the glass and this is extremely detrimental to the element characteristics. During the sputtering of an insulative layer, in particular, the substrate temperature will rise, causing deposition of these alkali ions on the substrate surface and to interact with the current through the transparent electrode (ITO) stripes. This will deteriorate the ITO composition, the electrode resistance will become very high and the characteristics of the EL element will become much worse.

It is therefore an object of this invention in view of the above to provide a highly reliable EL element by limiting the alkali content and volume resistivity of the substrate glass.

Figure 1:
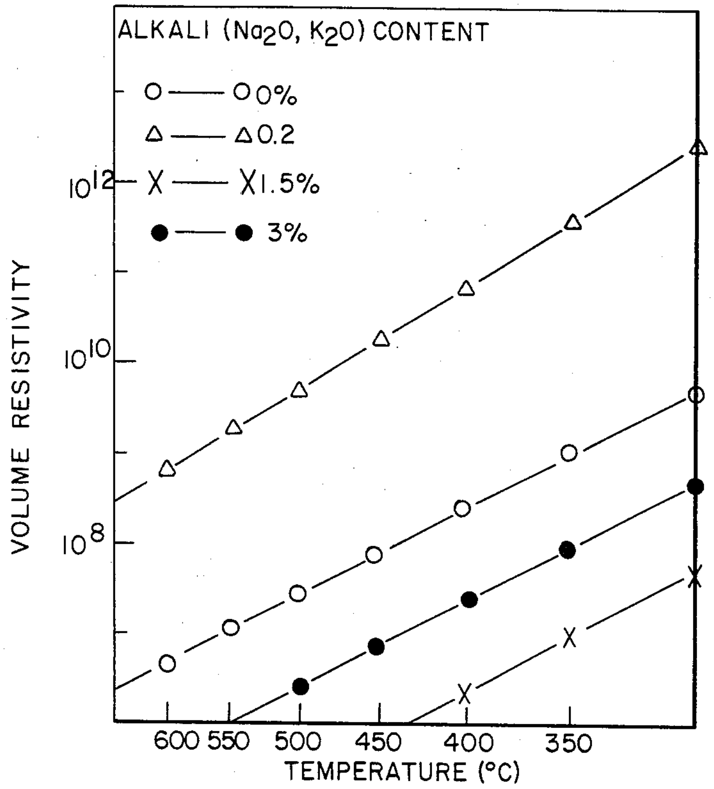
FIG. 1 is a diagram showing the relationship between the alkali content (wt%) of borosilicate glass used as substrate glass for an EL element and its volume resistivity at different temperatures.
Figure 2:
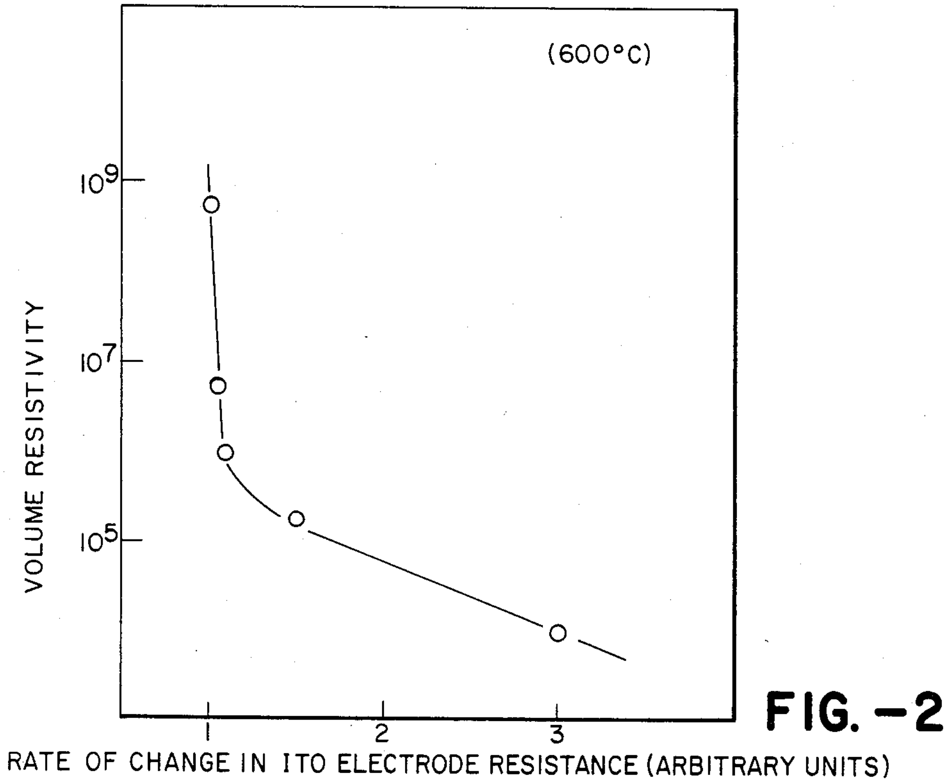
FIG. 2 is a diagram showing the relationship between the volume resistivity of glass and the rate of change in ITO resistance.
Figure 3:
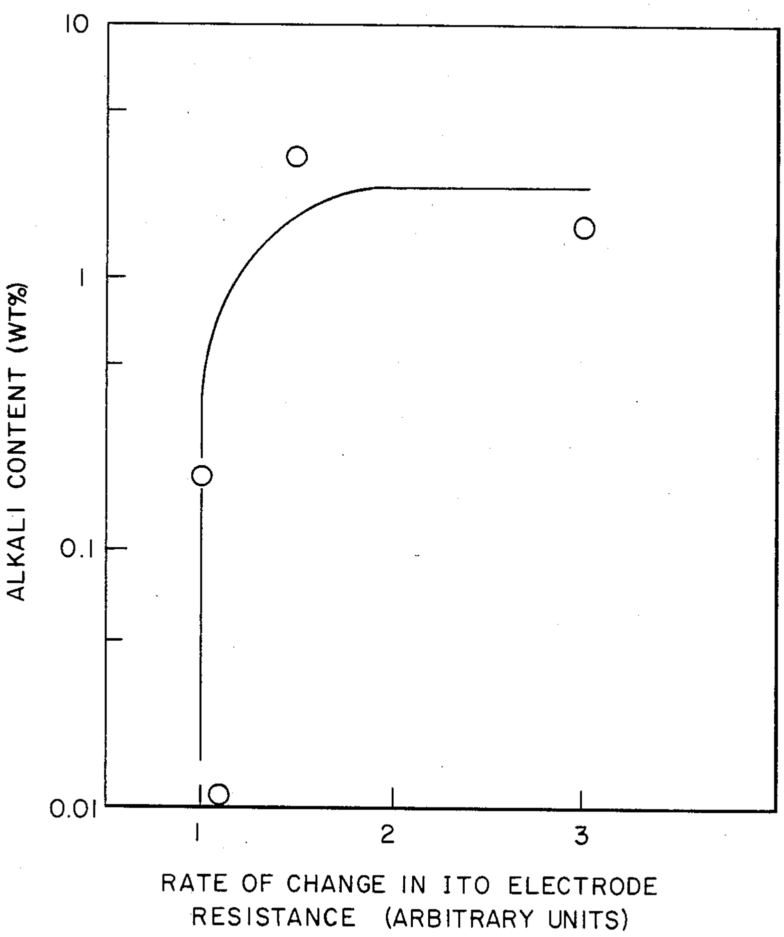
FIG. 3 is a diagram showing the relationship between the alkali content of glass and the rate of change in ITO resistance.

FIG. 1 shows generally that the kinds of glass with less alkali contents have higher volume resistivity, but that this relationship is reversed between concentrations of 0% and 0.2% and also between concentrations of 1.5% and 3%. This is because of the relative composition of glass material ($B_2O$, $Al_2O_3$ and $SiO_2$) and the mixing ratio of the added alkalies ($Na_2O$ and $K_2O$). From FIG. 2 which shows the relationship between the volume resistivity of glass and the rate of change in ITO resistance at substrate temperature of 600° C., one learns that the rate of ITO resistance at 600° C. becomes extremely high for the types of glass with volume resistivity of $10^6$ ohm-cm or less. FIG. 3 shows the relationship between the contents of alkali constituents ($Na_2O$ and $K_2O$) in glass and the rate of change in ITO resistance. In view of the above, EL elements with improved display quality and reliability can be obtained by using as substrate the non-alkali type of glass with volume resistivity $10^6$ ohm-cm or greater at 600° C. and alkali content of 0.5 wt% or less.

In the Table below, characteristics of four commercially available types of glass (NA40 by Hoya, MH700 by TDK, AN by Asahi Glass and 7059 by Corning) are shown.

TABLE 1

| | NA40 (Hoya) | MH700 (TDK) | AN (Asahi) | 7059 (Corning) |
|---|---|---|---|---|
| Volume resistivity at 600° C. (ohm-cm) | $10^6$ | $10^9$ | $10^{10}$ | $10^8$ |
| Alkali content (wt %) | 0 | 0.2 | 0 | <0/3 |
| Strain point (°C.) | 673 | 660 | 665 | 593 |

Of these, Corning 7059 is not satisfactory because its strain point is below 600° C. Among the remaining three types, MH700 is less satisfactory because it is somewhat weak against acid. NA40 by Hoya and AN by Asahi Glass are preferable. The glass substrate of a thin film EL element according to the present invention, therefore, must have volume resistivity of $10^6$ ohm-cm or greater at 600° C., alkali content of 0.5 wt% or less, or preferably 0.2 wt% or less and strain point of 600° C. or higher.

What is claimed is:

1. A thin film EL element comprising a glass substrate of other than molten silica, a pair of electrode layers formed on said glass substrate, and an electroluminescent layer sandwiched between said electrode layers, said glass substrate being non-alkali type glass having volume resistivity of $10^6$ ohm-cm or greater at 600° C., alkali content of 0.5 wt% or less and strain point of 600° C. or higher.

2. The thin film EL element of claim 1 wherein said glass substrate is non-alkali type glass having alkali content of 0.2 wt% or less.

* * * * *